United States Patent
Fathalla

(10) Patent No.: US 7,380,235 B1
(45) Date of Patent: May 27, 2008

(54) APPLICATION PROGRAM INTERFACE CALL REPLAY TOOL

(75) Inventor: Diaa Fathalla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 10/607,593

(22) Filed: Jun. 27, 2003

(51) Int. Cl.
G06F 9/44 (2006.01)

(52) U.S. Cl. ...................................... 717/109

(58) Field of Classification Search ........ 717/104–107, 717/112–113, 137–147, 160, 109, 124, 114, 717/158; 707/1, 103 R, 2, 10; 709/227, 709/250, 200–223; 715/738, 501.1
See application file for complete search history.

(56) References Cited

U.S. PATENT DOCUMENTS

| | | | |
|---|---|---|---|
| 5,495,571 A | 2/1996 | Corrie et al. | |
| 5,513,315 A | 4/1996 | Tierney et al. | |
| 5,745,767 A | 4/1998 | Rosen et al. | |
| 5,754,755 A | 5/1998 | Smith | |
| 5,774,725 A | 6/1998 | Yadav et al. | |
| 5,860,004 A * | 1/1999 | Fowlow et al. | 717/109 |
| 5,875,334 A * | 2/1999 | Chow et al. | 717/141 |
| 5,892,950 A * | 4/1999 | Rigori et al. | 717/146 |
| 6,067,639 A | 5/2000 | Rodrigues et al. | |
| 6,408,403 B1 | 6/2002 | Rodrigues et al. | |
| 6,557,120 B1 | 4/2003 | Nicholson et al. | |
| 6,577,982 B1 | 6/2003 | Erb | |
| 6,625,804 B1 * | 9/2003 | Ringseth et al. | 717/114 |
| 6,654,953 B1 * | 11/2003 | Beaumont et al. | 717/158 |
| 2003/0154191 A1 * | 8/2003 | Fish et al. | 707/2 |
| 2003/0208743 A1 * | 11/2003 | Chong et al. | 717/106 |

* cited by examiner

Primary Examiner—Tuan A Vu
(74) Attorney, Agent, or Firm—Christensen O'Connor Johnson Kindness PLLC

(57) ABSTRACT

An application program interface (API) replay tool and method is disclosed for modeling and testing APIs. The replay tool receives as input a set of API calls and associated context information and resources. A set of components are called to map variables and a context into the replay tool environment. An API builder translates the original API call (including mapping memory references of parameters) into a sequence of assembly code instructions, constituting the replayed API call, which is placed in an execution buffer. The execution buffer is thereafter executed in a replay environment including a set of resources extracted from a source binary file associated with the replayed API. Thereafter, the operating system, or other suitable consumer of API calls, executes the call in the context recreated by the API replay tool prior to passing the call.

23 Claims, 5 Drawing Sheets

| | |
|---|---|
| 300 | API Call Fields |
| | API ID |
| | Thread ID |
| | Process ID |
| | API Name |
| | API Calling Module Name (ex: cards.dll) |
| | API Calling Module ID (an ID to be given at recording time) |
| | API Called Module Name (ex: user32.dll, kernel32.dll) |
| | API Called Module ID |
| | Depth (nesting level) |
| | Time Stamp |
| | API's GLE |
| | Failure/exception info. |
| 330 | API Parameters (one set per parameter) |
| | Size |
| | Type (ID and Name) |
| | Base Type (ID and Name) |
| | Array Size |
| | Indirection Count |
| | Modifier (In, Out, In/Out) |
| | Number of members (for structures) |
| | GUID |
| | Parameters to be retrieved |
| | Verification values |
| | Attached values |
| | Flags |
| 360 | Operating System Message |
| | Message ID |
| | Message Type (user/system) |
| | LParam and WParam |
| | Time Stamp |
| | Handle |
| 390 | Resources to be Retrieved |

FIG. 3

| | |
|---|---|
| 400 | Initialize |
| 402 | RunLog |
| 404 | CreateInitialProcess |
| 406 | CreateInitialThread |
| 408 | HandleSpecialAPI |
| 410 | IsFilteredAPI |
| 412 | GetFirstLogRecord |
| 414 | GetNextAPICode |
| 416 | GetNextLogRecord |
| 418 | GetNextBlockCode |
| 420 | GetNextSegmentCode |
| 422 | GetInterface(*) |

FIG. 4

| | |
|---|---|
| 500 | Memory Manager |
| 510 | Process Block |
| 520 | Thread Block |
| 530 | Memory Block |
| 540 | Code Data |

FIG. 5

APPLICATION PROGRAM INTERFACE CALL REPLAY TOOL

FIELD OF THE INVENTION

This invention generally relates to the area of computer systems. The present invention concerns software development and testing tools, and in particular, methods and systems for investigating the behavior of programs under controlled conditions and verifying their proper operation. In the particular area to which the present invention is directed, the behavior of application program interfaces (APIs) are tested by submitting API calls including various combinations of parameter values to an operating system component (e.g., a DLL) that executes the call.

BACKGROUND OF THE INVENTION

There exists a general need in the development of software/systems to ensure that the finished product is sufficiently tested prior to its release to the public. Such testing is performed to detect programming errors/flaws. Corrections are formulated and then incorporated into subsequent versions of the software. There are various levels of testing thoroughness. The more thoroughly the software is tested prior to release of the software to users, the less likely bugs will be exposed in the subsequent use of the released software.

An application program interface of an operating system comprises a set of methods defining entry points by applications into the functionality (e.g., retrieving/opening files, launching executable programs, printing, etc.) supported/provided by the operating system. Furthermore, the functionality of the operating system comprises groups of related functions referred to herein as components. In the Microsoft WINDOWS operating system, examples of components include: Kernel, GDI, User and Shell. Application program interface (API) testing ensures that operating system components (e.g., printing, shell, etc.), when called upon by application programs, execute in an intended manner.

One general technique for testing operating system components involves writing applications to directly call and test operating system components via their specified API methods. In such case, the application programs are written for the sole purpose of exercising the operating system component(s) under test. Such approach provides a high level of control over testing. By directly programming the calls themselves, a tester is able to tailor a test to include specific inputs to APIs under specific contexts. On the other hand, testing cannot be performed until the test program has been rendered.

Another general technique for testing an operating system API avoids the need to write a particular program to act as the caller to the components under test. This alternative approach involves running application programs and observing their operation (and errors/fault) with regard to the various called components of the operating system via the API. This approach avoids the need to author an application to submit calls to the operating system components. Furthermore, this approach ensures that at least the application used to perform the testing operates properly with regard to the particular operating system API. A potential shortcoming of this approach is the wide variety of applications that execute on an operating system and call upon its functionality through the API.

The above-described approaches to API testing, while offering particular advantages, also exhibit shortcomings including either an inability to exhaustively test an API or alternatively perform such exhaustive testing at a very high price in testing time and resources. One especially vexing problem arises during the exhaustive testing of an API either to verify proper operation (e.g., verify security and compare against expected results), during performance testing (e.g., determining machine cycles needed to complete), and during regression testing. In known systems, a test program is written and compiled into an executable that is then executed to exercise the API and verify returned results. Though this task is relatively easy to explain, carrying out the programming, if performed correctly, is time consuming. As a result, an inordinate amount of effort is devoted to programming the tests rather than defining its scope and specifying its content.

SUMMARY OF THE INVENTION

The present invention seeks to address many of the shortcomings of the prior art with regard to generating and executing a sequence of API calls for a variety of purposes, including, for example, testing the APIs on a new platform or diagnosing an error through the use of a test harness. The present invention enables testing to focus upon the design and specification aspects of testing rather than the previously time consuming programming of a test program that will carry out the test.

In accordance with the present invention, a tool for replaying an API call (hereinafter "API replay tool") facilitates creating and submitting API calls based upon input API call records. The API replay tool ensures that the API calls, executed from potentially a sequence of logged API calls, replay in a meaningful manner. This is generally accomplished by translating addresses (memory references) specified by recorded API calls into addresses within the API replay tool's memory space. More particularly, the API replay tool includes a symbol table for mapping memory references within an input API call record into a memory space allocated to the API replay tool. In a particular embodiment, such mapping occurs from a recorded address to a replay address space allocated to a thread within the API replay tool with which the API call is associated.

After mapping the addresses/memory references into the memory space of the API tool, an API call builder utilizes the address mapping relations stored within the symbol table to create a call code sequence for invoking the API to the environment of the API replay tool. The memory references within the call code sequence are specified according to a set of mapping entries within the symbol table.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 3 depicts a set of fields supported by the log reader for API calls;

FIG. 4 depicts a set of methods/functions supported by the replay engine of the illustrative example of an API replay tool embodying the present invention;

FIG. 5 depicts a set of interfaces associated with the memory manager of the replay tool.

DETAILED DESCRIPTION OF THE DRAWINGS

Figure 1:
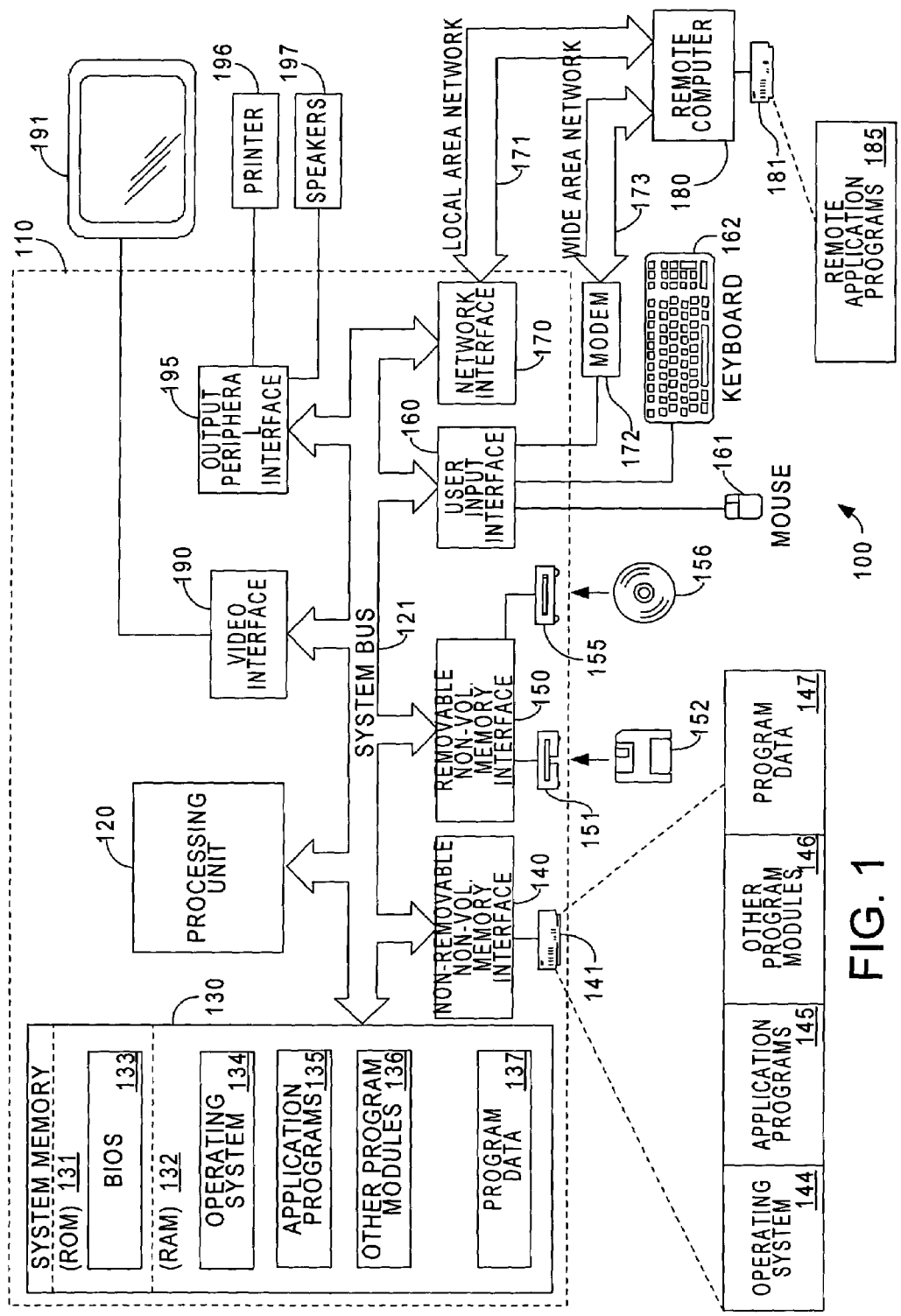
FIG. 1 is a block diagram depicting an exemplary computer system for carrying out an embodiment of the invention.

The illustrative example of the present invention embodies a new approach to supporting/carrying out testing and verifying operating system components (e.g., compatibility, security, regression, etc.) through the submission of API calls in a controlled environment. In contrast to application replay tools (e.g., program debuggers), which walk the binary code of an application, an API replay tool replays a sequence of API calls. As such, the program state of the computer is composed by the API replay tool prior to submitting the replayed API call to make up for potentially missing/changed context information that arises from not replaying each one of a sequence of binary code instructions generated by the application.

In summary of the system disclosed herein below, the API replay tool is a core component within a test system that takes as input a set of API call records (described with reference to FIG. 3). The inputted API call records include both the API call as well as information sufficient to enable re-creation of the environment within which the API is to be executed when the API call is replayed. While the API call records can be logged by an API call capture mechanism during execution of an application program, the source of the API call records is not material to the API replay tool.

The API replay tool includes a replay engine that coordinates building memory structures for presenting the API calls to the appropriate operating system component during replay. One of the functions performed by the replay engine is the mapping of locations of parameters and structures into the memory space maintained by the API replay tool. The mapping information is stored within symbol tables.

After performing this initial setup function, the replay engine passes the API call record to a thread handler that establishes, if necessary, a thread block in memory maintained by a memory manager to store relevant segments of data associated with a thread identified in the API call record received from the replay engine. If needed, the API call record is passed to a callback handler to establish a location for handling a callback from the operating system when the API call is executed.

An API call builder, referencing the context, thread, and mapping information provided by the previously mentioned functional entities within the API replay tool, creates an API call structure including code (the API call) and data (the associated parameters). This structure is thereafter passed by the API replay tool to an API call executer that, in turn, submits the call to the proper execution component of the operating system (or an emulator thereof).

Thus, as can be seen from the above summary, in an embodiment of the present invention, the API replay tool receives as input a sequence of API call records. The API replay tool creates a context for a thread within which the API call will be executed. Memory references within the original API call are mapped to the memory space of the API replay tool. An API call is created and executed according to the context and mapping created by the API replay tool. Thus, there is no need for a tester to create an executable for submitting a sequence of API calls to perform a test of an API interface. Instead, the API replay tool itself is the executable and the API call records comprise data that drives the execution of the API replay tool.

Turning to the drawings, FIG. 1 illustratively depicts an example of a suitable operating environment 100 for carrying out portions of the API replay tool and method embodying the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Accelerated Graphics Port (AGP), Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor 191, computers may also include other peripheral output devices such as speakers 197 and printer 196, which may be connected through an output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
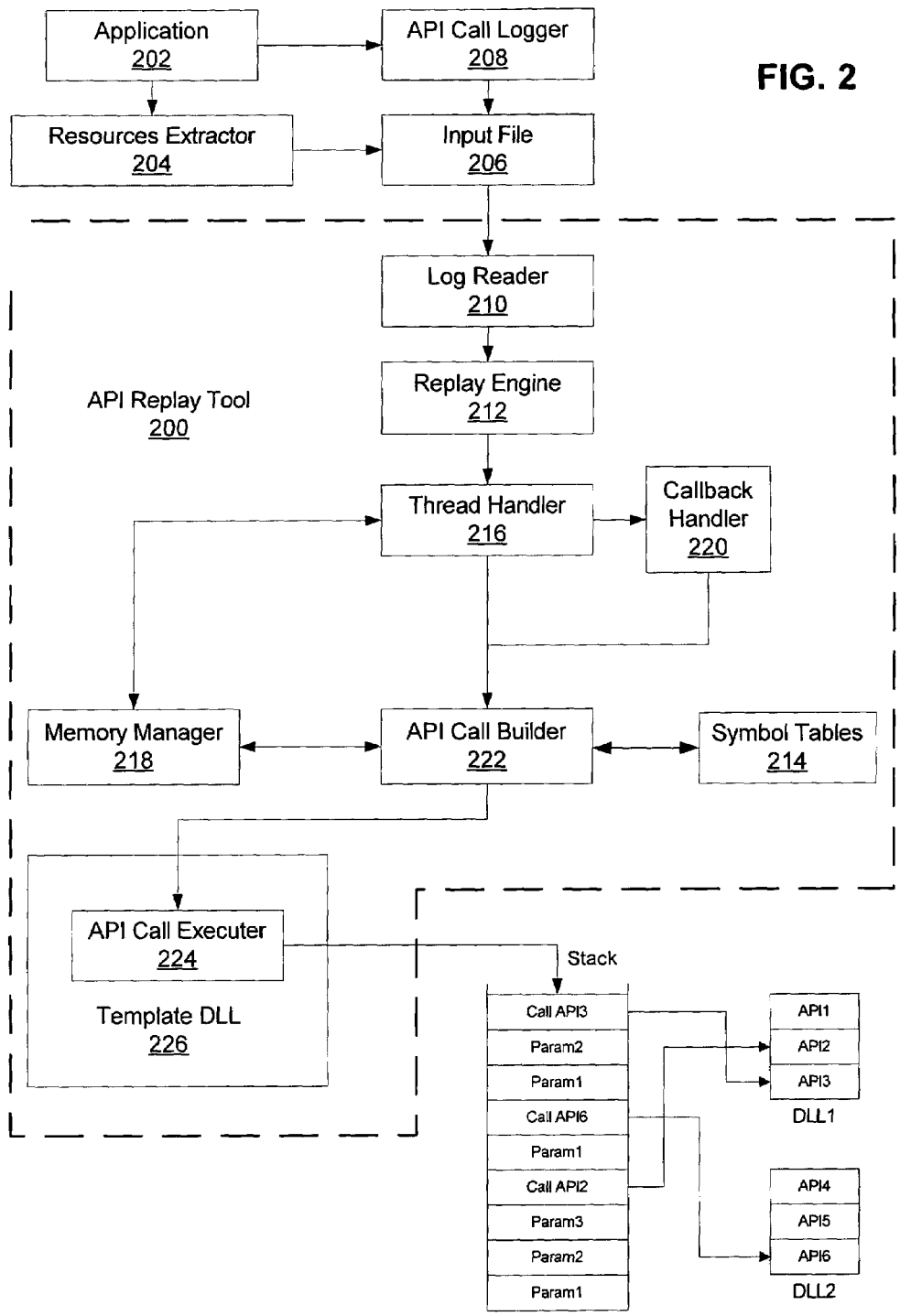
FIG. 2 is a schematic diagram depicting an exemplary organization of components making up an API replay tool embodying the present invention.

Turning to FIG. 2, a schematic diagram illustratively depicts the functional relationships between the components that make up an exemplary API replay tool 200. In an embodiment of the invention depicted in FIG. 2, by way of example and not limitation, the API calls are handled singly without regard to preceding or subsequent API calls. However, in alternative embodiments of the invention, sequences of API calls are received and replayed as a group. It is noted that the directionality of the lines connecting the functional entities identified in FIG. 2 are intended to show the flow of data rather than calls invoking the functionality of the identified blocks. Furthermore, while not shown in the drawings, the API replay tool 200 can be fitted with any of a variety of user interfaces/faceplates (e.g., command line) to carry out a variety of tasks involving controlled replay of API calls—either individually or as a sequence of related calls. It is contemplated that the API replay tool 200 will comprise a core component of a variety of utility applications for debugging/analyzing/investigation application programs through the direct submission of API calls to the operating system components rather than requiring the creation and compiling of an application to achieve the same goal.

The API calls and associated resources that drive the API replay tool 200 are provided by any of a variety of sources. In the illustrative embodiment, the API call sequences originate from an application 202. More particularly, a resources extractor 204 identifies and copies resources (e.g., icons, dialog boxes, controls, etc.) from the application 202 into an input file 206. The resources are incorporated into the API replay tool 200 so that the resources are available to the operating system when API calls referencing them are called.

The manner of incorporating resources of the application 202 into API replay tool 200 varies in alternative embodiments of the invention. In the replay architecture depicted in FIG. 2, the resources of the application 202 are read into the API replay tool 200. Thereafter, the resources are copied/incorporated into a Template DLL instance 226 (described below) instantiated from a base Template DLL class. The Template DLL instance 226 corresponds to a particular binary/executable file (e.g. Solitaire.exe). An API call Executer 224 (described below) in the Template DLL 226 references the resources of the Template DLL 226 during execution of API calls. In this arrangement, if needed resources exist in more than one binary file of an application, additional instances of the template DLL base class, similar in structure to the template DLL 226 but having a different set of resources (determined by the binary file that it represents), are spawned and the proper resources are injected into the new Template DLL instances.

The input API calls to the API replay tool 200 are generated in a variety of ways and thus the manner of generating such calls should not be construed to limit the present invention. In the illustrative embodiment, during execution of the application 202, API calls submitted by the application 202 (including associated context and calling parameters) are trapped by an operating system API trapping mechanism (e.g. a shim) and passed to an API logging tool 208 such as, for example an APPLOGGER API call recording tool. The API logging tool 208 stores the API calls, in the form of a set of API call records in the input file 206. An exemplary set of fields within an exemplary API call record provided by the API logging tool 208 are depicted in FIG. 3 described herein below. Alternatively, input file 206 comprises a sequence of API calls and associated call parameters that are supplied by a developer or a tester who wants to verify the behavior of running the APIs with the specifically recited parameters.

A log reader 210 opens and processes the API calls stored within the input file 206. The log reader 210, in an embodiment of the invention, reads API call records from the input file 206. The API calls retrieved from the input file 206 include pertinent replay information needed to provide a proper context for the API call including: passed parameters, returned values, a time stamp, thread, . . . etc. (see, FIG. 3 described herein below). The log reader converts the input record stream into an output stream of records, representing API calls, messages, etc., that are passed by the log reader 210 to the replay engine 212. In an embodiment of the invention, the log reader 210 processes the call records on an individual basis (i.e., in isolation without considering relationships between separate API calls). However, in an alternative embodiment, multiple related/unrelated API calls are retrieved by the log reader 210 from the input file 206. The log reader 210 also retrieves the stored resources in the input file and passes them to the replay engine 212. The replay engine 212 passes the resources into a Template DLL instance (e.g., the Template DLL 226) through, for example, a generalized module loading mechanism prior to executing any API calls from the input file 206.

In an embodiment of the invention, the replay engine 212 executes a loop to read an input record provided by the log reader 210. Thereafter, the replay engine 212 invokes other components of the API replay tool 200 to prepare an API call in the environment of the API replay tool. The functionality of the replay engine 212 is described in detail herein below with reference to a set of methods/functions supported by the replay engine 212 depicted in FIG. 4. The components of the API replay tool 200 invoked by the replay engine 212 are described herein below.

In an embodiment of the invention, each API call processed by the API replay tool 200 is associated with a thread, or similar mechanism that associates an API call with a particular sequence of executed commands and a context. Furthermore, the API replay tool 200 executes the API calls in the same sequence as the API calls were recorded in their original execution (i.e., as captured in the input file 206). Since such execution potentially requires simultaneously maintaining multiple threads (and their contexts), a thread handler 216 creates/maintains a new context (e.g., allocation of memory, resources, etc.) for each thread identified in the set of API calls associated with the input file 206 while submitting API calls to an API call builder 222 (described below). The thread context, by way of example, includes all the context information for a thread (e.g., code segment, data segment, stack, instruction pointer, message queue, etc.).

In a particular example of multi-threaded API replay, the input file 206 includes API calls that identify two threads (T1 and T2), and each thread calls the APIs A1, A2, A3 in sequence. The following sequence is recorded and provided by the input file 206:

T1(A1), T1(A2), T2(A1), T1(A3), T2(A2), T2(A3).

To handle the multiple, simultaneously active threads, the thread handler 216 spawns two threads, one to replay thread T1's API calls and the other to replay thread T2's API calls. The thread handler 216 executes the API calls to A1 and A2 from thread T1. Next, the thread handler 216 switches to the context for thread T2 and initiates replaying A1 in thread T2's context. The thread handler 216 next switches back to thread T1's context for replaying A3. Finally, the thread handler switches back to thread T2's context to replay API calls A2 and A3.

Having described the thread handler 216, it is noted that, in an embodiment of the invention, the API replay tool 200 supports replaying API calls associated with multiple processes represented in the input file 206. In such case, a process handler (not shown) is inserted (functionally) on top of the thread handler 216 of the API replay tool 200. The process handler maintains structures that facilitate tracking/coordinating execution of particular threads within specified processes.

The context structure for each thread and process (if supported) is maintained by a memory manager 218. In general the memory manager 218 maintains the memory space needed to simulate/replay the processes and threads within the environment of the API replay tool 200. The memory manager 218 allocates/maintains memory blocks and segments within blocks for the memory structures associated with processes, threads, stacks, code, data, etc. through a set of methods/functions. In an embodiment of the invention the memory manager 218 allocates a process block comprising n thread blocks (one per thread within the process). Each thread block includes a code segment, a data segment and a stack segment. The interface of the memory manager 218 is described further herein below with reference to FIG. 5.

The API replay tool 200 is intended to support an extensible set of special handlers that are selectively/conditionally invoked to handle particular API call scenarios. One such special case involves callback functions. Some API methods/functions support callback functionality. When such APIs are called from an application, the application passes a callback address for a function within the application's code space. When a particular condition/event is encountered, the operating system calls the function within the application's code space. Replaying such APIs requires establishing and passing an address for the callback function in the API call in the context of the replay tool 200, and then executing the callback function when it is invoked by the return call from the operating system. In an embodiment of the invention, the callback handler 220 processes API calls that include the callback functionality. In such instances, a callback address is established for the callback function. The callback handler 220 receives the callback call when the operating system invokes the callback address. Thereafter, the callback handler 220 replays the set of APIs associated with the callback function through calls to the API call builder 222. The set of API calls associated with the callback function are obtained by/for the callback handler 220 from the set of API calls provided by the input file 206. Those calls are then sequentially submitted by the callback handler 220 to the API call builder 222 to facilitate their construction and execution within the context of the API replay tool 200. The callback handler 220 includes callback tracing mechanisms for handling callback functions invoked within callback functions. In each instance, the callback function assigns a depth to the callback API call sequence and marks the return point in the previous level that invoked the callback function.

The API call builder 222 is the compiler/interpreter/supplier of API calls. The API call builder 222 receives high level, unmapped, API call records containing the information needed to submit an API call to the operating system (or simulator thereof). In an embodiment of the invention, the API call builder 222 initially maps memory references (e.g., variables, pointers, etc.) associated with the API call from their logged values to memory locations in the replay context. The API call builder 222 translates each API call record into assembly code sequences and stores the code sequences and associated data in a buffer maintained by the memory manager 218 for a thread with which each API call is associated. As those skilled in the art will readily appreciate from the disclosure herein, the API call structures are potentially generated through a variety of translation mechanisms. In an embodiment of the invention, the API call builder 222 supports processing API call records through both an interpreter and a compiler. In alternative embodiments either one, both or alternatives of these translation mechanisms are enlisted to render the executable call structures that are then provided to an API call executer 224.

As mentioned previously above, in an embodiment of the invention, the API call builder 222 populates, and thereafter accesses the mapping information contained in, the symbol tables 214 that map memory references from their original logged addresses to their replay addresses. Thus, for each memory reference identified in an input API call record, the API call builder 222 creates a corresponding (mapped) location within the process space of the API replay tool 200 maintained by the memory manager 218. In an embodiment of the invention, the symbol tables 214 comprise a set of objects that maintain data structures facilitating mapping memory/names from the application 202 environment (i.e., before "replay") to the API replay tool 200 environment (i.e., at/after "replay"). Take for example the following example involving a handle. When CreateFile and ReadFile APIs are recorded, CreateFile returns a handle that ReadFile uses as an input parameter. For example:
 0x12345678 CreateFile(_,_,_, . . . )
 ReadFile(0x12345678,_,_, . . . )

During replay, CreateFile will most likely return a different value than 0x12345678. Assume the returned value is 0x87654321. When CreateFile is replayed and the new handle value, 0x87654321, is returned, the symbol tables 214 will maintain a mapping entry including the original file handle, 0x12345678, and the new file handle 0x87654321. Thus, every time the original file handle is encountered, the replay engine will look up the original handle and replace it with the new handle assigned to the file for purposes of replaying the API calls involving the file. Therefore, when the API replay tool replays the sequence, it will take on the following mapped appearance:
 0x87654321=CreateFile(_,_,_, . . . )
 ReadFile(0x87654321,_,_, . . . )

Similarly, the symbol tables 214 handle mapping variables (including pointers), filenames, and strings. In the case of pointers, a new memory buffer is allocated for storing the data referenced by the original pointer from an input API call, the data referenced by the original pointer is copied to the new memory buffer, and a new pointer location is established corresponding to the location of the new memory buffer. Thereafter, each time the pointer is encountered during replay, the location of the data referenced by the pointer in the context of the replay tool is determined by looking up the location in the symbol tables 214. The symbol tables 214, in an embodiment of the invention, include a separate table for each type of mapped data (e.g., variables and file names are stored/mapped in distinct tables). However, in other embodiments, a single table is used for mapping symbols. The symbol tables 214 are accessed by the API call builder 222 to generate proper memory locations for various parameters and references encountered while processing API call records retrieved by the replay engine 212 from the input file 206. An example of this mapping-based substitution of memory locations is described by way of example herein below.

During the course of building an API call, the API call builder 222 obtains context information from the memory manager 218 for the particular thread with which the call is associated and extracts the relevant information for the API call (e.g., parameter values). The memory references (e.g., pointers) are the raw references provided in the original API call retrieved from the input file 206. Therefore, during the course of building an API call, the API call builder 222 accesses the symbol tables 214 to obtain the current memory locations of the referenced data. During the translation process that renders a sequence of assembly code instructions corresponding to an executable API call, the form of the assembly code generated by the API call builder 222 is based upon the system that will execute it (e.g., 32-bit system). The API call builder 222 stores the resulting sequence of assembly code instructions within a code segment of a memory block. The memory block within which the assembly code instructions are stored corresponds to a thread identified in the original API call record.

The following example illustrates the translating and the assembly code instruction building functionality of the API call builder 222. Consider an API foo(DWORD dwTemp, LPCSTR szStr). The foo API call takes two parameters, dwTemp and szStr. A DWORD data type is a 4-byte value and a LPCSTR data type is a 4-byte string pointer. The API call builder 222 is passed on API call Foo(0x12345678, 0x12121212) for replay. The value 0x12121212 is a string pointer pointing to a string "Hello." The sequence of assembly code instructions (placed in the appropriate code segment of a thread memory block) generated by the builder 222 for this particular call will have the machine equivalent to the following lines of assembly code:

Push some special register code
Push 0x12345678
Push 0x34343434
Call foo
Pop some special register
Return It is noted that 0x34343434 has replaced the string pointer value 0x12121212. This has occurred due to the translation, by the API call builder 222, of the original address specified by the input API call record into the context of the API replay tool 200. The API call builder 222 recognized the parameter value 0x12121212 as being a pointer in the context of "recording" the API call. The value referenced by the string pointer value 0x12121212, "Hello," was also recorded by the API call logger 208. When the input file 206 was processed by the API replay tool, the "Hello" string was read into a dedicated location (x34343434) in the replay context (and more particularly the data segment), and the old and new pointer values were stored in the symbol tables 214. When the API call builder 222 creates assembly code for replaying the "foo" API call it accesses the symbol tables 214 and substitutes the reference value 0x12121212 with the replay context-based pointer value x34343434. Thus, when the assembly code sequence is executed, the pointer will properly reference the "Hello" string in the replay context rather than the original "recording" context.

After translating the API call record into an API call in the form of assembly code and data (in the replay context), the API call builder 222 passes the address of the assembly code, stored in the code segment of a particular thread's memory block, to an API call executer 224 to initiate execution of the API call by an operating system component (or some other component that executes the call such as an emulator). The API call executer 224 thereafter executes the passed assembly code instruction sequences and in doing so submits the API call built by the API call builder 222 the operating system (or simulator/emulator thereof) component, such as DLL1 that supports execution of the called method or function of the operating system.

In an embodiment of the invention, the execution stage is carried out by the API call executer 224 that executes within a re-created execution environment (e.g., within the presence of a set of resources) of a particular binary file supplied by the Template DLL 226. The API call executer 224 receives a reference to the API call assembly code segment created by the API call builder 222, executes the call embodied in the assembly code and associated data contained in an associated thread memory block, and then returns control back to the replay engine 212 for execution of a next API call record (or set of API call records).

By way of example, in an embodiment of the invention, the Template DLL 226 is a template from which multiple copies are made to simulate execution of a set of running binaries through injection of resources supplied by those binaries. Take for example, an application like "solitaire.exe" that has a cards.dll, and both solitaire.exe and cards.dll each has its own resources. Furthermore, a log file has the following sequence of records:

(1) Solitaire.exe Foo1(a,b)
(2) Solitaire.exe Foo2(c,d)
(3) Cards.dll Foo3(e,f)
(4) Cards.dll Foo4(g,h)

If log record (1) is going to be replayed, then a copy of the base Template DLL (e.g., Template DLL 226) is instantiated and named Solitaire.exe, and Foo1(a,b) is executed in the API call executer (e.g., API call executer 224) for Solitaire.exe. The record (2) is executed in the API executer 224 for Solitaire.exe as well. However, when record (3), which references Cards.dll is executed, another copy of the Template DLL is created (not shown in FIG. 2) and named Cards.dll. Thereafter, record (3) for an API Foo3(e,f) is called from Cards.dll. Thus, in an embodiment of the invention, each Template DLL instance represents a distinct binary environment (e.g., resources) for executing API calls via the particular binary.

While not depicted in FIG. 2, a user interface enables user interaction with the API replay tool. Through the user interface, users are able to submit commands to the API replay tool to load and execute the input file (or portion thereof) and observe the results. The present invention can be implemented with any of a variety of interfaces including command line (text interface) and graphical user (menus, pointer devices, etc.) interfaces. The present invention contemplates using any appropriate user interface.

Turning to FIG. 3 a set of fields associated with an API call are depicted. As mentioned previously herein above, in an embodiment of the invention the API replay tool 200 submits a sequence of API calls previously trapped during execution of an application. In such case a set of values are recorded that represent the state of the system at the time each API call was executed to facilitate, to the extent possible, re-creating the system state when the API call is replayed through the API replay tool 200.

In an embodiment of the invention, the log reader 210 supports API call records specifying replay/context information including: API call 300, API parameter 330, API operating system message 360, and API resources 390 context information. Each of these portions of the input API call records is discussed herein below.

The API call information 300 includes a set of fields containing information needed to set up a particular type of API call and its call context. The call itself is identified by an API ID and API Name. A process ID and thread ID enable tying the call to memory structures maintained by the memory manager 218 based upon instructions from the aforementioned process handler and thread handler 216. The API call information also includes fields identifying the name and ID of a module within an application from which the API call originated. Another set of fields identifies a called module of the operating system by name and ID.

The API replay tool 200 supports nesting of API calls within the execution of another API call. Each time an API call invokes another API call prior to completion, the nesting depth is incremented. The depth of the nesting of such calls is specified in a depth field of the API call information 300.

Time stamps have a number of uses in various embodiments of the invention. For example, in an embodiment of the invention, the API calls are replayed in the same order that they were originally invoked by the application 202 and subsequently recorded by the AppLogger 208. A value stored within a time stamp field of the API call information 300 facilitates arranging the records in their order of execution in the event that they are not stored in chronological order. The value of the time stamp corresponds to when the API call was recorded by the application API logger 208. Alternatively the time stamp value is specified by the operating system when the API call was originally executed. An API's GLE (get last error) is also recorded to specify an error, if any, that occurred during execution of the API call.

A failure/exception field stores any information returned by the operating system associated with problems encountered while executing the API call.

The API call records include API parameter information 330 for each parameter associated with the API call (both input and output). A size field specifies the length of the parameter (e.g., the number of bytes). The parameter type and base type are specified by both name and ID. In the case where the parameter is an array, an array size (e.g., char [260]) field stores the dimensions of the array. The API replay tool supports mapping pointer to actual values. The level of indirection is specified by an indirection field (e.g., DWORD* pdw has an indirection value of 1 while DWORD pdw has an indirection value of 2). A modifier field specifies whether the parameter is an input parameter, output parameter or input/output parameter. The parameter information 330** also supports structure parameters (in the context of C/C++ programming a structure is a set of combined parameters). In the case of structures, the number of members and some form of directions for reading/enumerating them from the structure is designated. A GUID field (or fields) stores any unique identifiers assigned to the parameter. Yet another field or combination of fields specify parameters to be retrieved by GetNumParams, GetParam (ParamNum) calls associated with an API call parameter. Another set of fields specifies verification values from an extended manifest (e.g., GetValidRange, GetInvalidRange, GetAppValidParamRange, GetAppInvalidParamRange). Another parameter information field handles values attached to the parameters (e.g., enum var(EMPTY=0, API, MSG) GetNumValues=3, GetValueString(1)=API). Finally, an embodiment of the invention supports designating flags associated with each parameter through calls to the system (e.g., GetNumFlags, GetFlag).

The operating system message 360 includes a set of fields defining any operating system messages that arose from the logged API call. Each message is identified by a message ID and message type (i.e., user or system message). In addition to passing an LParam and WParam message parameter (information holders), a time stamp specifies when the message was issued by the operating system. A handle field specifies a unique handle assigned to the message for purposes of identifying the message within the context of the application executing on the system.

As mentioned above, the API replay tool 200 embodying the present invention receives, via the input file 206, a set of resources extracted from the application 202 from which the recorded API calls originated. The resources to be retrieved 390 specifies a set of resources within the application 202 that need to be retrieved to facilitate executing the API call.

It is noted that the above-described API call record information identified in FIG. 3 is exemplary, and those skilled in the art will appreciate that other combinations of such fields are utilized in alternative embodiments of the invention based upon either the needs of the particular replay tool or the capabilities of the operating system to supply/support the API call/context information.

As explained above with reference to FIG. 2, consumption/execution of the above described API call record is coordinated by the replay engine 212. Turning to FIG. 4, a set of methods/functions are identified that are supported by the replay engine 212. In an embodiment of the invention the replay engine 212 comprises a base set of methods/functions and a set of interfaces to each of the functional parts of the API replay tool 200 with which the replay engine 212 interacts. An Initialize method 400 initializes the replay engine 212 and determines which parts of the API replay tool 200 need to be initialized.

A RunLog method 402, after initialization, calls internal methods CreateInitialProcess 404 and CreateInitialThread 406 which initialize the first process (if supported) and thread. In turn, the process and thread call the memory manager 218 to request allocation of memory for the initial process and thread, respectively.

A HandleSpecialAPI method 408 directs an API call currently being processed by the replay engine 212 to the appropriate part of the API replay tool 200.

An IsFilteredAPI method 410 performs the function of determining whether a particular API call is being ignored/discarded during the processing of an input set of API calls.

The replay engine 212 includes a set of functions that are responsible for retrieving API calls from the input file 206 via the log reader 210. A GetFirstLogRecord 412, after creation of a thread and allocating resources, obtains a first API call record from the input file 206. A GetNextAPICode method 414 is called by the Template DLL 226 to retrieve a next API call from the input file 206 for processing. The GetNextAPICode method 414, in turn, calls a GetNextLogRecord method 416 to retrieve the next log record from the input file 206 via the log reader 210. The replay engine 212 contacts the thread handler 216 to determine whether a thread context switch is needed. After the proper context is established, the API call is passed from the thread handler 216 (or callback handler 220 if a callback function is present) to the API call builder 222. A GetNextBlockCode method 418 and GetNextSegmentCode method 420 are utilized in an embodiment of the invention where a compiler processes a block (sequence) of related API calls and renders assembly code. Finally, a set of GetInterface(*) methods are supported by the replay engine 212 that return a reference to an interface for a particular component (e.g., memory manager 218, thread handler 216, log reader 210, etc.).

Having described an exemplary set of methods/functions supported by the replay engine 212, it is noted that the above-described interface of the replay engine 212 (summarized in FIG. 4) is exemplary. Those skilled in the art will appreciate that other combinations of methods and functions are provided in alternative embodiments of the invention based upon either the needs of the particular replay tool or the capabilities of the operating system to supply/support the API call/context information.

Turning to FIG. 5, a set of interfaces are identified for the memory manager 218 that support allocating memory, storing data within the allocated memory, and reading the stored data associated with the API calls processed by the API replay tool 200. A memory manager interface 500 includes methods for allocating and getting memory for: process blocks, thread code/data/stack segments (within allocated blocks), API call blocks, code blocks, and data blocks. After allocating the requested memory block/segment, the memory manager 218 returns a pointer to its beginning.

A process block interface 510 includes specialized methods for managing thread memory resources within a process block. Examples of such methods include, for example: GetFirstThreadBlock, GetNextThreadBlock, GetPrevThreadBlock and GetThread which returns a thread block address corresponding to a specified thread ID.

A thread block interface 520 manages an extensible variety of memory block types within a thread block. By way of example, the thread block interface 520 exposes methods to access particular types of memory blocks such as: stacks, API code and data blocks, API and message records, and message queues.

A memory block interface 530 is a template for any of the extensible set of memory block types managed by the thread block interface 520. A code data block interface 540 managed memory is allocated for the output parameters of an API call of a particular thread. The code data block interface 540 is used by the symbol tables 214 to keep track of output parameter values.

Figure 6:
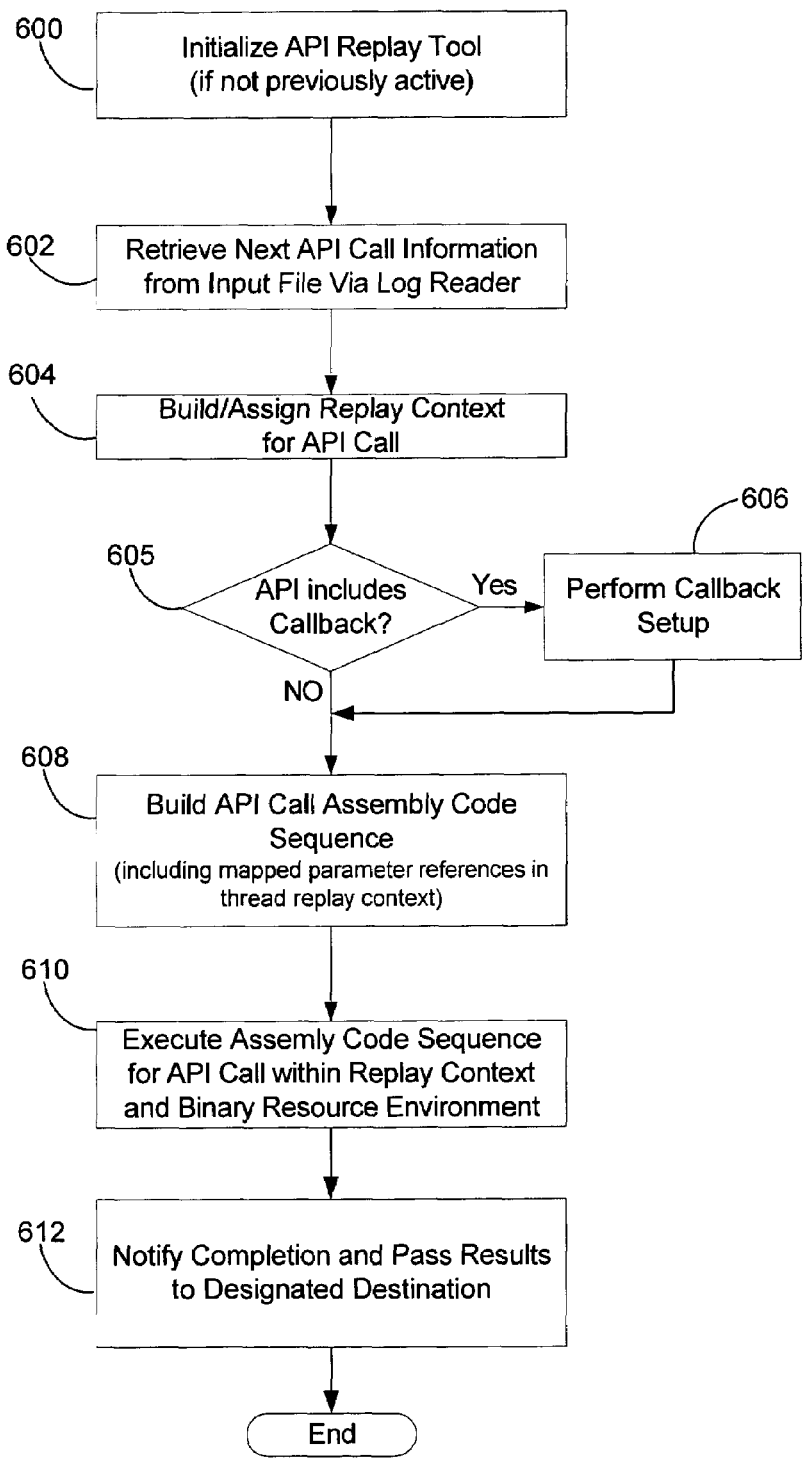
FIG. 6 is flowchart summarizing the primary stages associated with replaying an API call via the replay tool.

Having described the general organization of the API replay tool 200 and the functions performed by its primary components, attention is directed to FIG. 6 that depicts an exemplary sequence of steps performed by a system including the API replay tool to process a set of logged API calls. Initially, during step 600 the API replay tool 200 initializes, if it has previously not been active, in response to a call to initialize method 400 on the replay engine 212. In addition to performing its own initialization, in an embodiment of the invention, the replay engine 212 initializes other components of the API replay tool 200 (e.g., the log reader 210, thread handler 216, etc.).

Thereafter, during step 602 the replay engine 212 requests the log reader 210 to retrieve one or more API call records from the input file 206. The replay engine 212 builds a context for the API call (or calls) received during step 604. During step 604, as part of the setting up of a context for replaying the API call, the replay engine 212 passes the API call record to the thread handler 216 to assign the request a thread block set up in memory maintained by the memory manager 218 to handle the API call. The resources of a binary are injected into a Template DLL corresponding to the binary with which the API call is associated.

After performing step 604, at step 605, if the API call includes a callback function, then control passes to step 606 wherein the callback aspects of the API call (e.g., setting up the location in memory of the callback function and passing the location to the API call builder 222) are carried out by the callback handler 220 described herein above. Control then passes to step 608. If no callback function is implicated in the API call, then control passes from step 605 to step 608.

At step 608 the API call builder 222 initially processes the memory references within the API call. In cases where the references require translation to the replay context, the API call builder 222 determines new addresses for referenced data structures and variables within a memory block allocated to a thread identified within the input API call record. The API call builder 222 adds mapping entries in the symbol tables 214 as needed to map addresses of parameters (e.g., pointers, variables, etc.) specified in the input API call record to corresponding memory locations assigned to the parameter values within the execution environment of the API replay tool 200. The API call builder thereafter generates an assembly code instruction sequence corresponding to the API call. The resulting API call includes the mapped memory addresses for the passed parameters. The API call builder passes a reference to the assembly code instruction sequence to the API call executer 224.

At step 610 the API call executer 224 executes assembly code instructions corresponding to the API call by invoking the appropriate system module (e.g., DLL) to carry out the function specified in the API call structure based upon the passed parameter data. Upon completion, the API call executer 224, at step 612, notifies the replay engine 212 (and passes any relevant completion data/error messages).

It will be appreciated by those skilled in the art that a new and useful method and system has been described for replaying API calls. In view of the many possible environments to which the principles of this invention may be applied and the flexibility of designing and carrying out software utilities and tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computing device containing a software tool for submitting API calls corresponding to logged API calls to various components of the computing device, the software tool comprising:

symbol tables for mapping symbols, parameters and memory references collected from a log of API calls to corresponding memory references allocated to the software tool, wherein the mapped symbols, parameters and memory references are used for submitting subsequent API calls corresponding to the logged API calls from within the memory space of the software tool to the various components of the computer device, and wherein the log of API calls records API calls that have been previously invoked in an execution environment of the software tool;

an API call builder for creating an API call code sequence for submitting subsequent API calls corresponding to logged API calls to the various components of the computing device according to the mapped memory references within a symbol table; and an execution template corresponding to binary files associated with the logged API calls for maintaining a set of resources from the binary files, wherein the execution template is utilized by an API call executor so that the API call sequence created by the API call builder is executed within the execution environment of the software tool.

2. The computing device containing the software tool of claim 1 further comprising:

a memory manager that maintains memory space allocated to the software tool to simulate processes and threads associated with particular execution contexts for the logged API calls.

3. The computing device containing the software tool of claim 2 further comprising:

a thread handler for establishing a thread memory structure for allocating memory and resources of the computing device, by the memory manager, that corresponds to each thread identified in the logged API calls.

4. The computing device containing the software tool of claim 1 wherein an API call executer issues the code sequence within the execution environment, including the set of resources established by the execution template.

5. The computing device containing the software tool of claim 1 further comprising a replay engine for coordinating the operation of a set of handlers within the software tool to render the subsequent API calls to appropriate components of the computing device within a context defined by the software tool.

6. The computing device containing the software tool of claim 5 wherein the set of handlers includes a callback handler for providing a callback destination for a callback function associated with the logged API.

7. The computing device containing the software tool of claim 1 wherein the memory references comprise pointers.

8. The computing device containing the software tool of claim 1 wherein the memory references comprise variables.

9. The computing device containing the software tool of claim 1 wherein the code sequence comprises assembly code instructions.

10. A method using a software tool for invoking API calls within an execution environment based on logged API calls, the method comprising:

mapping symbols, parameters and memory references in at least one symbol table to corresponding memory references allocated to the software tool, wherein the mapped symbols, parameters and memory references in the at least one symbol table are collected from a log of API calls and are used for invoking subsequent API calls based on the logged API calls from within the memory space of the software tool, and wherein the log of API calls records API calls that have been previously invoked in the execution environment of the software tool; and creating an API call code sequence for invoking the subsequent API calls based on the logged API calls, wherein the mapped memory references are specified for invoking the subsequent API calls; and maintaining, by an execution template corresponding to binary files associated with the logged API calls, a set of resources from the binary files, wherein the execution template is utilized by an API call executor so that the created API call sequence is executed within the execution environment of the software tool.

11. The method of claim 10 further comprising:
maintaining, by a memory manager, memory space allocated to the software tool for simulating processes and threads associated with particular execution contexts for the logged API calls.

12. The method of claim 11 further comprising:
establishing, by the memory manager, a thread memory structure for allocating memory and resources corresponding to each thread identified in the logged API calls.

13. The method of claim 10 further comprising:
issuing, by an API call executer, the API call code sequence within the execution environment, including the set of resources established by the execution template.

14. The method of claim 10 wherein the memory references comprise pointers.

15. The method of claim 10 wherein the memory references comprise variables.

16. The method of claim 10 wherein the API call code sequence comprises assembly code instructions.

17. A computer-readable storage medium including computer-executable instructions for invoking API calls within an execution environment of a software tool based on logged API calls to various components of a computing device, the computer-executable instructions performing the steps of:

mapping symbols, parameters and memory references in at least one symbol table to corresponding memory references allocated to the software tool, wherein the mapped symbols, parameters and memory references in the at least one symbol table are collected from a log of API calls and are used for invoking subsequent API calls based on the logged API calls from within the memory space of the software tool, and wherein the log of API calls records API calls that have been previously invoked in the execution environment of the software tool; and creating an API call code sequence for invoking the subsequent API calls based on the logged API calls, wherein the mapped memory references are specified for invoking the subsequent API calls; and maintaining, by an execution template corresponding to binary files associated with the logged API calls, a set of resources from the binary files, wherein the execution template is utilized by an API call executor so that the created API call sequence is executed within the execution environment of the software tool.

18. The computer-readable storage medium of claim 17 further comprising computer-executable instructions performing the steps of:
maintaining, by a memory manager, memory space allocated to the software tool for simulating processes and threads associated with particular execution contexts for the logged API calls.

19. The computer-readable storage medium of claim 18 further comprising computer-executable instructions performing the steps of:
establishing, by the memory manager, a thread memory structure for allocating memory and resources corresponding to each thread identified in the logged API calls.

20. The computer-readable storage medium of claim 17 further comprising computer-executable instructions performing the steps of:
issuing, by an API call executer, the API call code sequence within the execution environment, including the set of resources established by the execution template.

21. The computer-readable storage medium of claim 17 wherein the memory references comprise pointers.

22. The computer-readable storage medium of claim 17 wherein the memory references comprise variables.

23. The computer-readable storage medium of claim 17 wherein the code sequence comprises assembly code instructions.

* * * * *

UNITED STATES PATENT AND TRADEMARK OFFICE
CERTIFICATE OF CORRECTION

PATENT NO. : 7,380,235 B1  
APPLICATION NO. : 10/607593  
DATED : May 27, 2008  
INVENTOR(S) : Diaa Fathalla Page 1 of 1

It is certified that error appears in the above-identified patent and that said Letters Patent is hereby corrected as shown below:

In column 2, line 40, before "address" delete "replay".

In column 11, line 37, delete "sequences" and insert -- sequence --, therefor.

In column 16, line 24, in Claim 1, delete "computer" and insert -- computing --, therefor.

Signed and Sealed this
Nineteenth Day of April, 2011

David J. Kappos
*Director of the United States Patent and Trademark Office*